May 21, 1963     W. R. CARLSEN     3,090,168
TOOL HEAD FOR FINISHING MACHINE
Filed March 27, 1961     2 Sheets-Sheet 1

INVENTOR.
William R. Carlsen
BY
Harness, Dickey & Pierce
ATTORNEYS

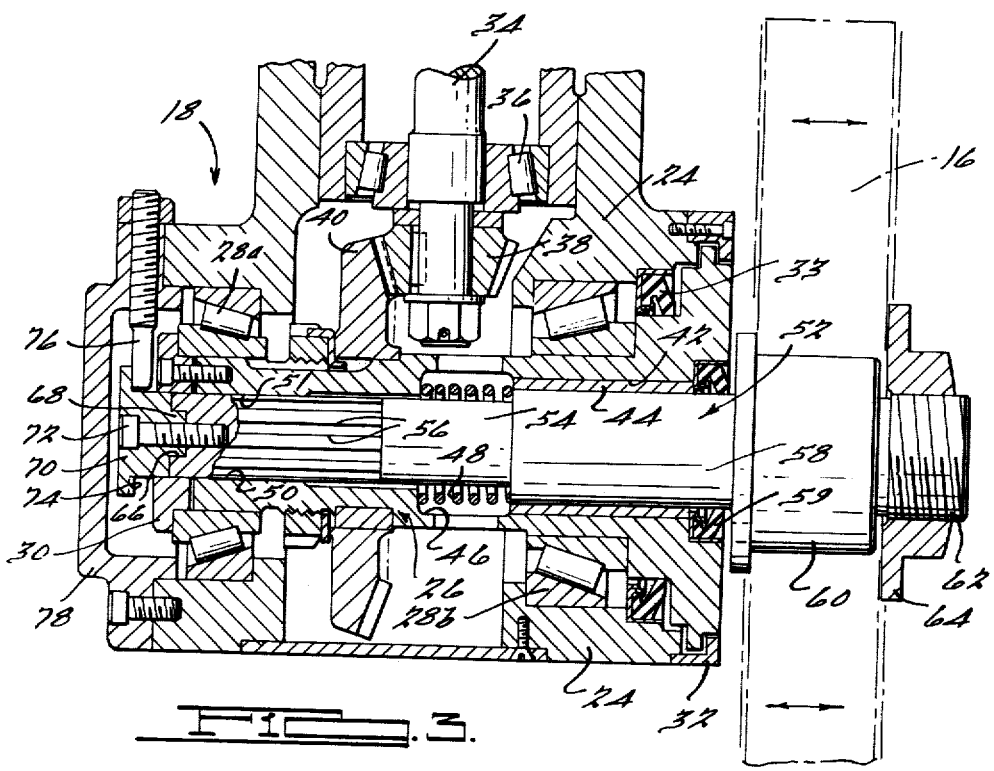

United States Patent Office 3,090,168
Patented May 21, 1963

3,090,168
TOOL HEAD FOR FINISHING MACHINE
William R. Carlsen, Huntington Woods, Mich., assignor to Michigan Tool Company, Detroit, Mich., a corporation of Delaware
Filed Mar. 27, 1961, Ser. No. 98,612
4 Claims. (Cl. 51—52)

The present invention broadly relates to finishing machines and more particularly to an improved cutter head having a gear-like finishing tool rotatably and reciprocably mounted thereon for accurately finishing the surfaces of tooth elements such as gear teeth, splines, serrations, and the like.

Finishing machines of the general type to which the present invention is applicable provide a quick and effective method of accurately finishing the surfaces of tooth elements. Machines of this general type include a gear-like tool such as a conventional shaving cutter or an abrasive honing tool which are adapted to be rotated in tight meshing relationship with the toothed workpiece to be finished. Shaving cutters are conventionally employed for accurately finishing the toothed elements of rough cut workpieces. Abrasive gear-like honing tools are particularly applicable for quick removal of nicks and burrs on hardened teeth and also correct small dimensional inaccuracies such as tooth spacing, involute profile, lead and runout caused during heat treatment of a gear, or the like. The correction of such dimensional inaccuracies provides for improved contact patterns of mating teeth causing a material reduction in the noise level of such gears and obviate, in most instances, the heretofore costly and time consuming practice of matching and lapping gears in pairs.

In a conventional finishing operation, the gear-like shaving tool or honing tool is rotated in tight mesh with the hardened workpiece having tooth elements thereon at crossed axes providing rapid removal of surface metal and providing a highly polished surface finish. The work gear which is run in tight mesh with the gear-like tool at crossed axes is reciprocated longitudinally of the tool whereby the full-faced width of each of the teeth of the work gear is traversed by the tool to effect a rapid machining operation and smooth surface finish.

It has now been found that by imparting a reciprocating movement to the gear-like finishing tool in combination with its rotating movement and the traversing movement of the work gear, a substantial improvement in the rate of machining and degree of surface finish are attained. In addition, during finishing operations of a shoulder work gear on a cluster, avoidance of interference between the shoulder gear and gear-like finishing tool requires a substantial reduction in the traversing movement of the work gear and/or a reduction in the angularity of crossed axes relationship resulting in slower machining rates, less accurate dimensional profiles, and inferior surface finishes. By virtue of the combined reciprocating and rotating movement of the gear-like finishing tool, in accordance with the practice of the present invention, shoulder gears can now be quickly and accurately finished across their entire tooth face by rotating the work in fixed position and utilizing the reciprocating movement of the finishing tool to cause a relative traversing movement between the work gear and finishing tool thereby accurately and uniformly finishing the flanks and faces of the tooth elements.

It is, accordingly a primary object of the present invention to provide an improved cutter head for a finishing machine which provides for concurrent rotation and reciprocation of a gear-like finishing tool mounted thereon providing therewith finishing characteristics heretofore unobtainable in machines of similar type.

Another object of the present invention is to provide an improved cutter head driven by a single power source for causing concurrent rotation and reciprocation of a tool mounted thereon.

Still another object of the present invention is to provide an improved cutter head assembly providing for concurrent rotation and reciprocation of a tool mounted thereon wherein the reciprocating movement is proportional to the rate of rotation and the frequency of reciprocation per revolution of the tool can be varied to achieve the best results.

A further object of the present invention is to provide an improved cutter head assembly which is of simple design, durable and accurate operation, and of economical manufacture.

A still further object of the present invention is to provide an improved cutter head providing for current rotation and reciprocation of a tool mounted thereon which enables more rapid and accurate finishing of shoulder gears on a cluster than has heretofore been possible.

The foregoing and other objects of the present invention are achieved by an improved cutter head assembly incorporating therein a tool spindle slidably disposed in axial alignment in a rotatably driven spindle and reciprocable therein through a predetermined stroke in response to cam means associated therewith.

Other objects and advantages of the present invention will become apparent from the following detailed description taken in conjunction with the accompanying drawings, wherein:

FIG. 3 is a horizontal longitudinal sectional view through the cutter head assembly.

FIG. 4 is a perspective view of a reverse face cam having one cam lobe thereon; and FIG. 5 is a perspective view of a modified form of the reverse face cam shown in FIG. 4 and incorporating a plurality of cam lobes thereon.

Figure 1:
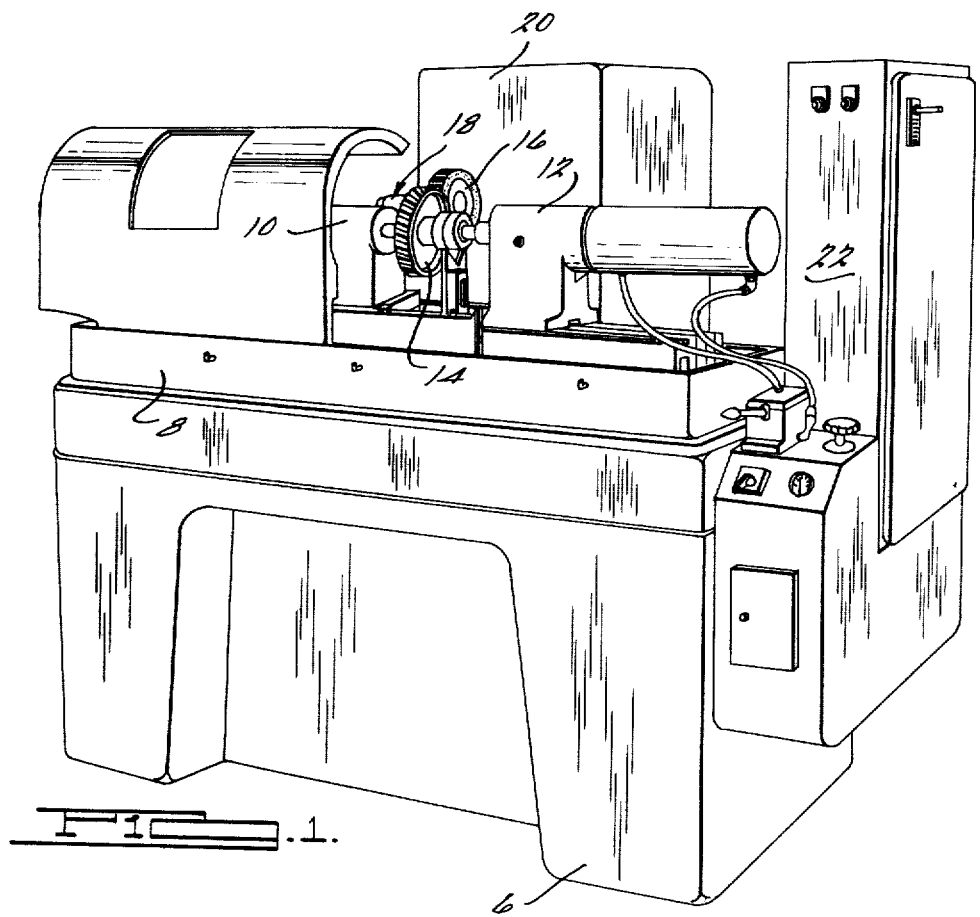
FIGURE 1 is a perspective view of the right front portion of a typical abrasive finishing machine to which the present invention is applicable.
Figure 2:
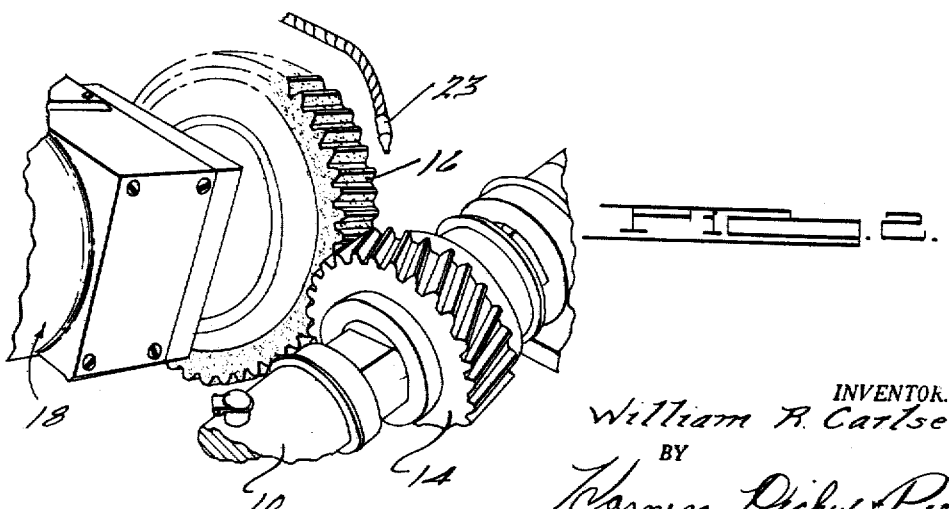
FIG. 2 is an enlarged fragmentary perspective view illustrating the cross axes meshing relationship between a work gear to be finished and an abrasive gear-like finishing tool rotatably and reciprocally mounted on a cutter head.

Referring now in detail to the drawings and as may be best seen in FIGS. 1 and 2, a finishing machine of the abrasive type exemplary of those to which the present invention is applicable, comprises in general, a bed 6 incorporating a reciprocable carriage (not shown) in the upper portion thereof on which a table 8 is mounted and reciprocable with the carriage longitudinally of the bed. The table 8 is provided with a series of longitudinal dovetail slots for receiving and removably mounting a head stock assembly 10 and a tail stock assembly 12 between which a work gear 14 is rotatably centered. The bed 6 contains a mechanism for reciprocating the carriage and the table 8 thereon longitudinally of an abrasive gear-like tool 16 which is disposed in tight meshing engagement with the work gear 14 and is rotatably driven and axially reciprocated by a cutter head 18 drivingly mounted on a tool head assembly 20 which is slideably mounted at the rear portion of the bed 6 and movable in a direction transversely of the longitudinal axis of the table 8.

The tool head assembly 20 in the exemplary abrasive finishing machine illustrated in the drawings, is mounted on precision rolls and is counterweighted so as to maintain a constant preselected pressure between the abrasive gear-like tool 16 and the work gear 14 during the finishing operation. By this arrangement the degree of pressure between the work gear and abrasive gear-like tool can be varied to provide for optimum finishing for a specific work gear configuration. The tool head assembly 20 is retracted slightly during the loading and unloading cycle of the machine to provide some clearance between the work gear and abrasive tool facilitating the loading and unloading of the work gear from between the head stock and tail stock assemblies.

The tool head assembly 20 contains a suitable reversible and variable-speed-drive mechanism drivingly connected to the cutter head 18. The speed of rotation of the tool can be varied to achieve optimum grinding or honing characteristic for each specific finishing operation. The direction of rotation of the abrasive gear-like tool 16 is reversed each time the direction of reciprocation of the carriage and table 8 is reversed. In finishing operations wherein the table 8 is not reciprocated, suitable timmer means can be employed to cause reversal of the direction of rotation of the abrasive tool in predetermined time intervals. In this manner both faces of each tooth element are accurately finished to the same desired profile and degree of surface finish. The preselected automatic cycling sequence of the machine is accomplished by a control system incorporated in a control cabinet 22 affixed to the right end of the machine as viewed in FIGURE 1.

The crossed axes relationship between the work gear 14 and the abrasive gear-like finishing tool 16 is best seen in FIGURE 2. The crossed axes relationship between the abrasive tool and work gear imparts a relative sliding movement between the tool and work gear at their points of contact providing therewith an abrasive action which promotes rapid removal of metal from the work gear. The longitudinal traversing movement of the work gear relative to the abrasive finishing tool imparted by the reciprocating movement of the table 8 further promotes this abrasive action and additionally assures accurate and substantially equal finishing along the entire face width of each tooth element. Further improvement in the efficiency of the grinding action and in the degree of surface finish obtained is provided by the novel cutter head comprising the present invention which concurrently imparts a reciprocating motion to the abrasive finishing tool at a frequency substantially higher than the reciprocating frequency of the table and which substantially decreases the time required to finish each unit and further enhances the accuracy and degree of smoothness of surface finish obtained. During the finishing operation a suitable cutting fluid can be supplied to the surfaces of the work gear by a nozzle tube 23, as shown in FIG. 2.

The abrasive gear-like tool 16 employed for finishing tooth elements is comprised of a plurality of tooth elements conjugate to the form of the tooth elements on a workpiece to be finished. The tooth elements are provided with an abrasive coating thereon or alternatively, the abrasive grains may be imbedded therein such as in the case of a resinoid bonded abrasive tool. Any one of the variety of conventional abrasive grains or mixtures thereof can be employed of the appropriate grit size and hardness to achieve the desired abrasive finishing action and resultant degree of surface finish.

The improved cutter head comprising the present invention also enables accurate finishing of shoulder gears on a cluster at a substantially higher rate and greater crossed axes angularity than has heretofore been possible and concurrently eliminates the tendency heretofore present of imparting an undesired taper in the teeth of the shoulder gear because of unequal abrasion rates along the face width of the tooth elements. The accurate, uniform and high speed finishing of shoulder gears constitutes still another important advantage of the present invention.

The cutter head 18 as may be best seen in FIGS. 2 and 3 is comprised of a housing 24 which is adapted to be adjustably mounted on the toolhead assembly 20. A tubular spindle or shaft 26 is rotatably mounted in the housing 24 by means of roller bearings 28a, 28b and is axially restrained therein by means of the coaction between a shoulder on one end of the tubular spindle disposed against the inner race of the bearing 28b and an end plate 30 securely bolted to the other end thereof and overlying the inner race of the roller bearing 28a. A ring 32 is securely fastened to the housing 24 and overlies a recessed end portion of the tubular spindle 26 to prevent entry of any foreign matter into the interior of the housing. A circular oil seal 33 extends around the tubular spindle 26 maintaining oil-tight integrity of the interior of the housing and preventing seepage of lubricant therefrom. Rotation of the tubular spindle 26 is achieved by a drive shaft 34 connected to the variable speed and reversible drive mechanism in the toolhead assembly 20. The drive shaft 34 is rotatably mounted on a bearing 36 and is provided with a bevel gear 38 keyed to the end thereof and disposed in constant meshing relationship with a bevel gear 40 keyed to the tubular spindle 26.

The tubular spindle 26 is provided with a stepped bore extending axially therethrough and includes a cylindrical bore portion 42 incorporating a sleeve bearing 44 therein, an annular bore portion 46 for receiving a helical compression spring 48, and a broached bore portion 50 provided with a plurality of longitudinal splines or serrations 51. A tool spindle or shaft 52 of a stepped configuration is disposed in axial sliding relationship within the stepped bore of the tubular spindle and is rotatably restrained therein. The tool spindle 52 comprises a shank portion 54 incorporating a plrality of splins or serrations 56 thereon which are disposed in longitudinal sliding engagement with corresponding splines or serrations 51 in the broached bore portion 50 of the tubular spindle 26 and a cylindrical portion 58 disposed in sliding relationship in the sleeve bearing 44. A ring-like oil seal 59 encircles the cylindrical portion 58 for preventing lubricant seepage between the tubular spindle 26 and tool spindle 52.

The projecting end of the cylindrical portion 58 of the tool spindle 52 is formed in the configuration of a hub 60 for mounting the abrasive gear-like finishing tool 16 thereon as shown in phantom and is provided with a threaded portion 62 at the end thereof on which a clamping nut 64 is threadably engaged for clamping the abrasive tool on the hub 60. The axial reciprocating movement of the abrasive tool along its axis of rotation and the fully projected and retracted positions thereof is diagrammatically indicated in phantom in FIG. 3. The end of the shank portion 54 of the tool spindle 52 is provided with a transverse keyway or recess 66 in which a projection on tang 68 on a reverse face cam 70 is slidably disposed and secured therein by means of a socket head screw 72. The reverse face cam 70 is provided with an annular cam surface 74 which axially deviates from a plane disposed substantially transverse of the axis of rotation of the tool spindle 52. The annular cam surface 74 is disposed in sliding engagement with a cam actuator 76 threadably secured to an end cap 78 removably secured to the housing 24. The axial lift or deviation of the annular cam surface 74 establishes the length of the axial reciprocating stroke of the tool spindle 52 and abrasive tool mounted thereon.

The annular cam surface 74 and the cam actuator 76 are maintained in intimate sliding contacts in response to the axial biasing force of the helical compression spring 48 which is disposed with one end thereof seated against the tubular spindle and the other end thereof seated against the annular shoulder between the shank portion 54 and cylindrical portion 58 of the tool spindle 52. In accordance with this arrangement, the tool spindle 58 is retracted inwardly or to the left as viewed in FIG. 3, in opposition to the biasing force of the helical compression spring 48 in response to the coaction between the annular cam surface and the cam actuator. As the cam actuator rides off the crest of the cam lobe on the annular cam surface, the biasing force of the helical compression spring 48 causes the tool spindle 52 to move outwardly toward the right as viewed in FIG. 3, maintaining the cam actuator and annular cam surface in continuous sliding engagement.

The rotation of the tubular spindle 26 is transmitted to the tool spindle 52 through the coaction of the splines or serrations 51 in the broached bore portion 50 of the tubular spindle and the splines or serrations 56 extending longitudinally along the shank portion 54 of the tool spline. Accordingly, the rotational drive imparted to the tubular spindle 26 by the drive shaft 34 and bevel gear 38 thereon concurrently effects rotation of the tool spindle 52 at a preselected speed and axial reciprocation thereof about the axis of rotation.

The frequency and length of stroke of reciprocation of the tool spindle for each rotation thereof is established by the specific configuration of the annular cam surface 74 of the reverse face cam 70. The height of the ramp of the annular cam surface 74 establishes the length of the reciprocating movement or stroke of the tool spindle and the number of cam lobes therearound establishes the number of strokes per revolution. In addition, the specific configuration of the ramp establishes the speed and acceleration of the outward and return stroke of the tool spindle. For example, the raising and lowering ramps of each lobe may be similar providing for equal velocity of the projecting and retracting strokes of the tool spindle or, if desired, the raising ramp may be of a gradual helical form followed by a sharply inclined lowering ramp whereby the tool spindle is slowly projected and then quickly returned to the retracted position by the helical compression spring. As a typical example, a reciprocating stroke of about 0.050 inch was employed in one specific instance and produced highly satisfactory finishing characteristics.

A typical one-lobe reverse face cam 70 is illustrated in FIGURE 4 wherein the annular cam surface 74 is provided with a single cam lobe 80 which provides for one reciprocating cycle of the tool spindle per revolution thereof. An alternate satisfactory reverse face cam 70 is illustrated in FIGURE 5 employing three cam lobes 80a, 80b, and 80c, which are angularly spaced along the annular cam surface 74 in substantially equal arcuate increments providing therewith three reciprocating cycles per revolution of the tool spindle. The appropriate reverse face cam to achieve the desired reciprocating frequency for any given finishing operation, can be quickly installed on the end of the tool spindle by simply removing the end cap 78 from the housing and the socket head screw 72 enabling replacement of the reverse face cam with a cam of the desired configuration.

It will be apparent from the foregoing that the improved grinding or cutting efficiency and surface finish achieved by virtue of the combined reciprocating and rotating movement of the abrasive tool, or shaving tool, as the case may be, provided by the improved cutter head comprising the present invention, constitutes a significant improvement in the art of accurately finishing tooth elements such as gears, splines, serrations, and the like. Moreover, the versatility and flexibility provided by the interchangeable reverse faced cams and variable speed drive enables optimum finishing conditions to be selected for any specific workpiece configuration.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a machine for finishing the surfaces of gear teeth the combination comprising supporting means for rotatably mounting a workpiece, a cutter head assembly including an abrasive finishing tool rotatably and reciprocably mounted thereon and adapted to be disposed in abrasive crossed axis relationship with a workpiece to be finished, said supporting means and said workpiece thereon longitudinally reciprocable relative to said cutter head assembly said cutter head assembly comprising a housing, first shaft means rotatably mounted in said housing and having an axial bore therein, second shaft means slidably disposed in said bore and axially reciprocable therein, coacting means on said first and said second shaft means for rotatably securing said first and said second shaft means to each other, means on said second shaft means for removably securing said finishing tool thereon, drive means for rotating said first and said second shaft means, and cam means associated with said second shaft means for reciprocating said second shaft means axially in said bore in response to rotation of said second shaft means.

2. In a machine for finishing the surfaces of gear teeth the combination comprising supporting means for rotatably mounting a workpiece, a cutter head assembly including an abrasive finishing tool rotatably and reciprocably mounted thereon and adapted to be disposed in abrasive crossed axis relationship with a workpiece to be finshed, said supporting means and said workpiece thereon longitudinally reciprocable relative to said cutter head assembly said cutter head assembly comprising a housing, a first shaft rotatably mounted in said housing and having a bore extending axially therethrough, a second shaft slidably disposed in said bore and axially reciprocable therein, engaging means in said bore and on said second shaft for rotatably securing said first and said second shaft to each other, drive means drivingly connected to said first shaft for concurrently rotating said first shaft and said second shaft in said housing, mounting means on one projecting end portion of said second shaft for removably securing said finishing tool thereon, spring means disposed in said bore and coating between said first and said second shaft for axially biasing said second shaft in one direction relative to said first shaft, a cam on the other projecting end of said second shaft including a cam surface thereon axially deviating from a plane disposed substantially transverse of the axis of rotation of said second shaft, a cam actuator on said housing disposed in engagement with said cam surface for axially biasing said second shaft in opposition to said spring means and axially reciprocating said second shaft and said tool thereon in said bore in response to rotation of said second shaft.

3. The combination as set forth in claim 2 wherein said cam surface is provided with one cam lobe for causing one reciprocating cycle of said second shaft for each revolution thereof.

4. The combination as set forth in claim 2 wherein said cam surface is provided with a plurality of cam lobes causing a plurality of reciprocating cycles of said second shaft for each revolution thereof.

References Cited in the file of this patent

UNITED STATES PATENTS

| 1,989,651 | Drummond | Jan. 29, 1935 |
| 2,242,781 | Gideon | May 20, 1941 |
| 2,351,842 | Seibold | June 20, 1944 |
| 2,542,408 | Gridley | Feb. 20, 1951 |
| 2,942,389 | Praeg et al. | June 28, 1960 |

UNITED STATES PATENT OFFICE
CERTIFICATE OF CORRECTION

Patent No. 3,090,168                                  May 21, 1963

William R. Carlsen

It is hereby certified that error appears in the above numbered patent requiring correction and that the said Letters Patent should read as corrected below.

Column 3, line 19, for "timmer" read -- timer --; column 4, line 33, for "plrality of splins" read -- plurality of splines --; column 5, line 13, for "spline" read -- spindle --; column 6, line 30, for "finshed" read -- finished --; line 43, for "coating" read -- coacting --.

Signed and sealed this 3rd day of December 1963.

(SEAL)
Attest:
ERNEST W. SWIDER

EDWIN L. REYNOLDS

Attesting Officer                              Acting Commissioner of Patents